June 1, 1954   O. HARKE   2,679,864
MIXING VALVE
Filed Sept. 19, 1951   3 Sheets-Sheet 1
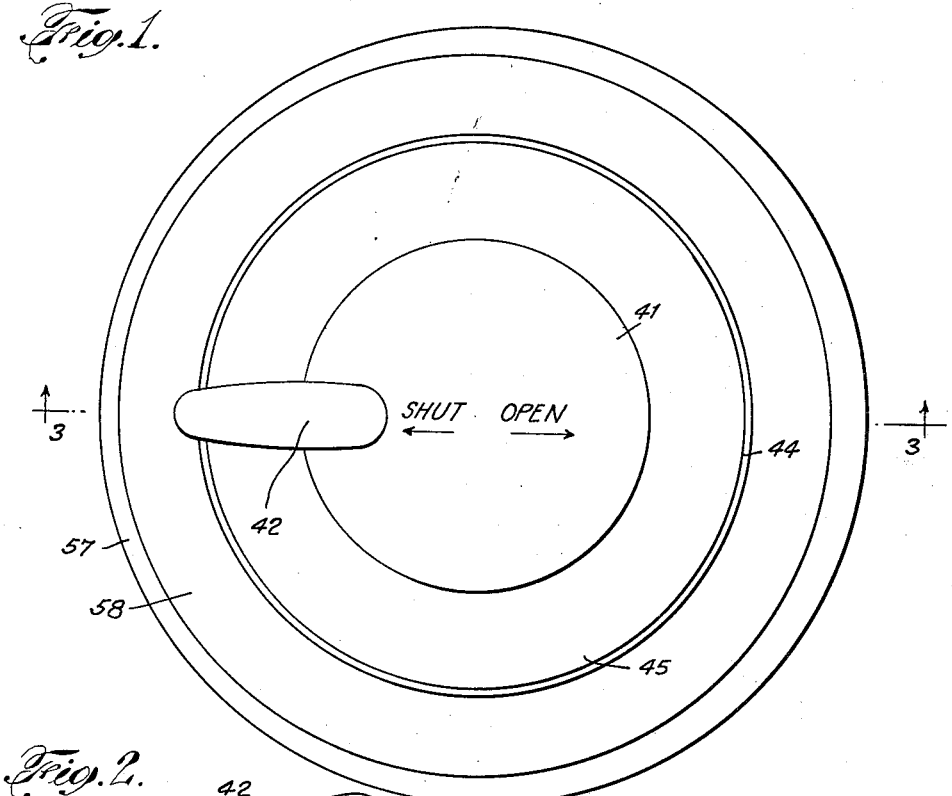
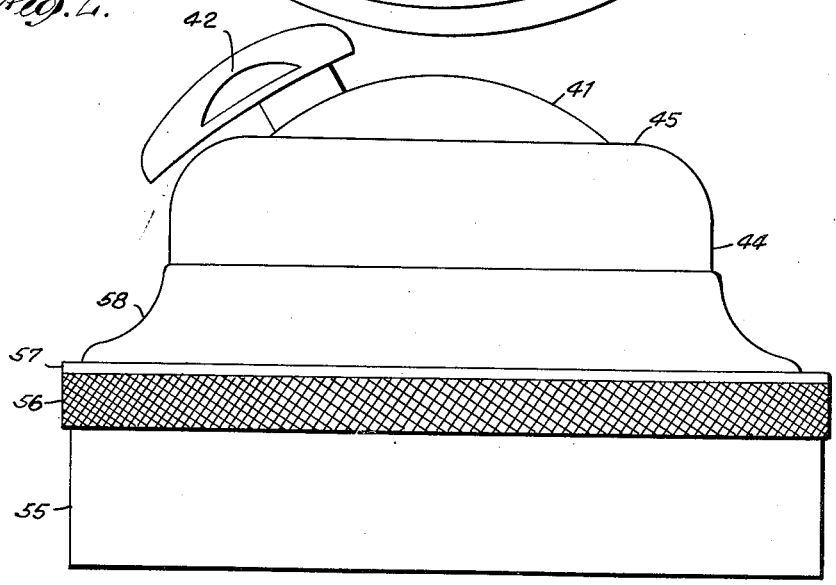
INVENTOR.
Otto Harke
BY
Emery, Varney, Whittemore & Dix
ATTORNEYS INVENTOR.
Otto Harke
BY
ATTORNEYS June 1, 1954  O. HARKE  2,679,864
MIXING VALVE Filed Sept. 19, 1951  3 Sheets-Sheet 3

INVENTOR.
Otto Harke
BY
Emery, Varney, Whittemore & Dix
ATTORNEYS

Patented June 1, 1954

2,679,864

UNITED STATES PATENT OFFICE 2,679,864

MIXING VALVE

Otto Harke, Woodside, N. Y.

Application September 19, 1951, Serial No. 247,301

17 Claims. (Cl. 137—635)

This invention relates to fluid mixing valves and faucets, and more particularly to valves and faucets which are adjustable to vary the flow of the mixed fluid, as well as to vary the proportions of the fluids, each independently of the other.

It is an object of this invention to provide improved means for varying the proportions of two fluids which are being mixed. It is a further object of the invention to provide improved means for varying the flow of the mixture. It also is an object of this invention to provide means which may be easily adjusted to vary the proportions of the fluids being mixed, while maintaining the flow substantially uniform, and to vary the flow, while maintaining the proportions substantially unchanged. Still another object of this invention is to provide valve mechanism for a hot and cold water faucet which may be adjusted by one hand to vary the proportions of hot and cold water, as well as to vary the volume of the flow, simultaneously or consecutively and each independently of the other, at the will of the operator. Other objects and advantages of this invention will appear hereinafter.

The invention will be described particularly with reference to a faucet valve such as is used in a shower bath, or a kitchen sink, or the like, for mixing hot and cold water to deliver water at a desired temperature. In such mixing faucets it is desirable to be able to adjust the proportions of the hot and cold water to give the desired temperature of outflow without disturbing the volume of flow, and to be able to vary the volume without disturbing the proportions of hot and cold water, and therefore the temperature of the delivered water. Otherwise, adjustment of one will necessitate readjustment of the other. Desirably these independent adjustments may be made either simultaneously, or consecutively.

A preferred embodiment of the invention selected for purposes of illustration is shown in the accompanying drawings. It will be evident from the following description that the present invention is not restricted to this illustrative example, but is to be limited only in accordance with the appended claims.

Figure 1 is a top plan view of the valve for a hot and cold water mixing faucet;

Figure 2 is a side elevation of the mixing valve shown in Figure 1;

Figure 3:
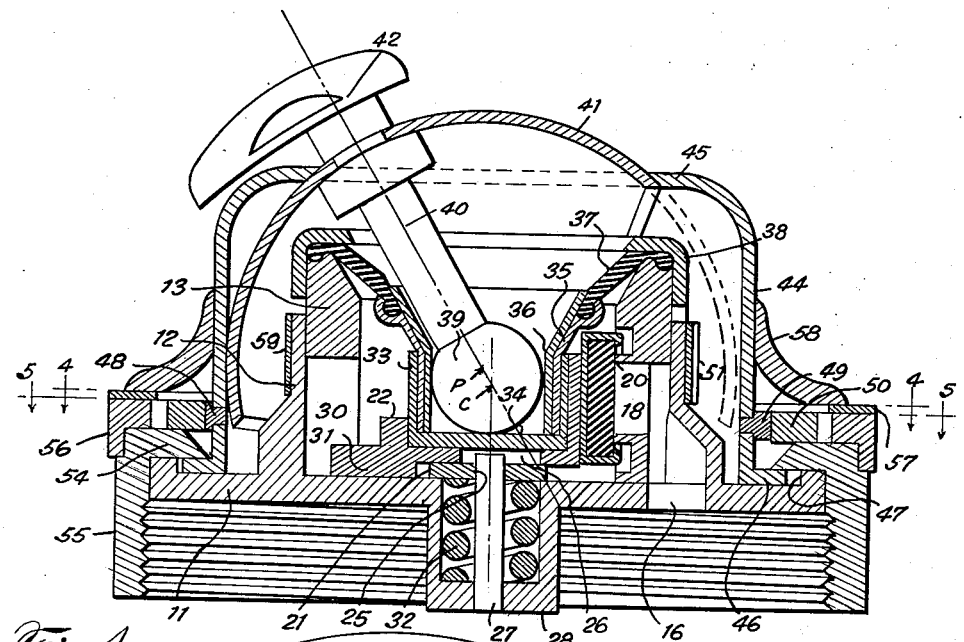
Figure 3 is a vertical section through the mixing valve substantially on line 3—3 of Figure 1.
Figure 4:
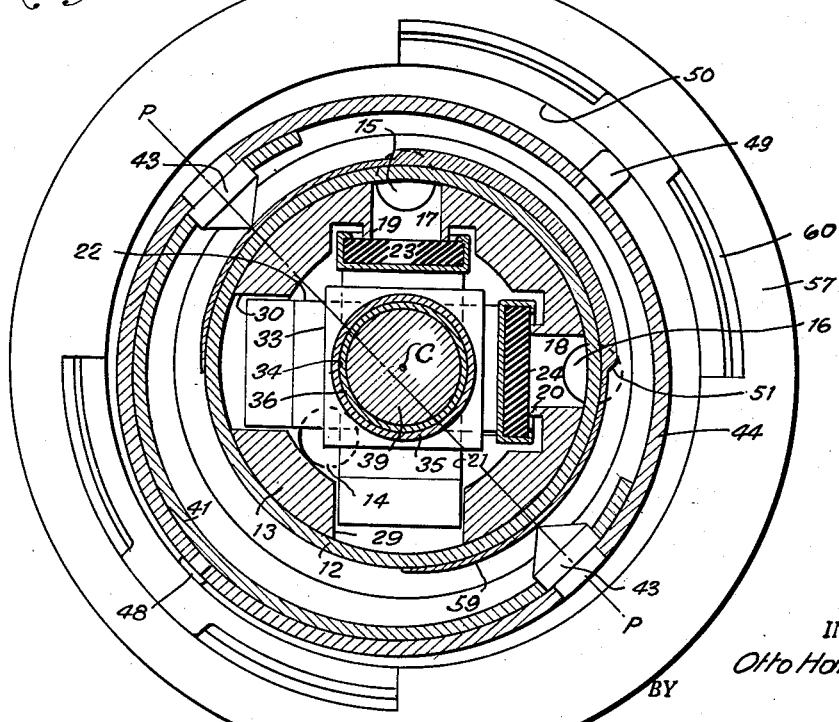
Figure 4 is a horizontal section through the mixing valve substantially on the broken line 4—4 of Figure 3, but showing the lever mounting means rotated 45° to the left from its position as shown in Figure 3.

Referring first to Figures 3 and 4 of the drawings, the circular base plate 11 has formed integrally therewith, on its upper surface and spaced inwardly from its edge, the cylindrical flange 12. Telescopically disposed within the flaneg 12 is the cylindrical liner 13, which rests on the base plate 11 and extends upwardly beyond the top of the cylindrical flange 12. As will be described more fully hereinafter, the liner 13 conveniently comprises the inlet openings for the hot and cold water into the mixing chamber and also means for guiding the valve brackets which control the flow of hot and cold water into the mixing chamber. In the illustrative embodiment, the flange 12 and the liner 13 are made separately for convenience in manufacture, but they could be made in one piece. The liner 13 will be soldered, brazed, or otherwise secured in the flange 12 to provide a fluid tight joint therebetween. Together, the cylindrical flange 12 and the liner 13 constitute a cylindrical water mixing chamber, the lower end of which is closed by the base plate 11. The cylindrical shape of the mixing chamber permits use of the wall thereof in the cam action adustment of the valve, as will appear hereinafter, but the mixing chamber need not be cylindrical.

The outlet from the mixing chamber conveniently will be located in the base plate 11, and an outlet opening is shown at 14. The base plate 11 also has openings 15 and 16 therethrough for the admission of hot and cold water, respectively, passageways 17 and 18 being formed in the cylindrical flange 12 and the cylindrical liner 13 so that the hot and cold water will enter the mixing chamber through openings in the inner surface of the liner 13. These inlet openings are spaced 90° from each other around the longitudinal axis of the mixing chamber, and preferably are disposed symmetrically with respect to the outlet opening 14. The hot and cold water inlet openings are formed with valve seats, for example as shown at 19 and 20, respectively.

Located within the mixing chamber are two valve brackets 21 and 22. These valve brackets are generally U-shaped and their bottoms cross each other at right angles and are slidable relative to each other. Valve bracket 21 is movable along a straight line, normal to the longitudinal axis of the mixing chamber, toward and away from the valve seat 19. The leg of this valve bracket adjacent the valve seat 19 is formed, for example as a cup, for holding a valve disk or washer 23 which cooperates with the valve seat to control the flow of hot water into the mixing chamber. Valve bracket 22 is movable along a straight line, normal to the longitudinal axis of the mixing chamber, toward and away from the valve seat 20. The leg of this valve bracket adjacent the valve seat also is formed to hold a valve disk or washer 24, which cooperates with the valve seat 20, to control the flow of cold water into the mixing chamber.

The guides for the sliding U-shaped valve brackets will now be described. The bottom of the valve bracket 21 slides on the base plate 11 and is provided with a longitudinally disposed slot 25 which slidably engages a pin 27 projecting upwardly from the base plate. In the illustrative embodiment the longitudinal axis of the pin 27 is an extension of the longitudinal axis of the mixing chamber. For reasons which will appear hereinafter, the pin 27 preferably will be mounted in a cup-like extension 28 formed integrally with and depending from the base plate 11.

Guide means are provided for the rear end of the valve bracket 21, that is the leg of the bracket opposite the valve disk 23, and in the illustrative embodiment the rear end of the bracket slidably engages an opening 29 in the lower edge of the cylindrical liner 13, this opening being diametrically opposite the valve seat 19. It will be evident that the valve bracket 21 is free to move along a straight line, normal to the longitudinal axis of the mixing chamber, toward and away from the valve seat 19, the bracket being guided by the pin 27 and the opening 29. When the valve bracket 21 is pressed toward the valve seat 19, the valve disk 23 engages the hot water valve seat 19, as shown in Figure 4, to shut off the flow of hot water into the mixing chamber. As the valve bracket 21 is moved away from the valve seat 19, hot water will be admitted to the mixing chamber, the volume of hot water admitted depending on the extent of movement of the bracket away from the valve seat.

The U-shaped bracket 22 is generally similar to the valve bracket 21. Since the bottom of the valve bracket 22 crosses over the bottom of the valve bracket 21, its rear end may be provided with a downwardly extending portion 31 equal to the thickness of the bottom of the bracket 21. This extension 31 engages the base plate 11 and prevents tipping or rocking of the bracket 22 relative to the base plate.

The bottom of the valve bracket 22 is provided with a longitudinally disposed slot 26 which slidably engages the pin 27, and the rear end of this valve bracket slidably engages an opening 30 in the lower edge of the cylindrical liner 13, diametrically opposite the valve seat 20. It will be evident that the valve bracket 22 is free to move along a straight line, normal to the longitudinal axis of the mixing chamber, toward and away from the valve seat 20, being guided by the pin 27 and the opening 30. Movement of the valve bracket 22 controls the flow of cold water into the mixing chamber, just as movement of valve bracket 21 controls the inflow of hot water. As shown in Figure 4, the cold water valve is closed.

Located between the legs of the crossing U-shaped valve brackets, and slidably engaged by both legs of both brackets, is a rectangular valve drive block 33. In the illustrative embodiment the U-shaped valve brackets are of a similar length and the valve drive block is square. When both the hot and cold water valves are closed in the illustrative embodiment, the valve drive block 33 is centered within the mixing chamber, as shown in Figure 4.

It will be evident that if the valve drive block 33 is moved downwardly, as viewed in Figure 4, the valve bracket 21 will be moved away from the valve seat 19 and hot water will be admitted to the mixing chamber. If the valve drive block 33 is moved to the left, as viewed in Figure 4, the valve bracket 22 will be moved away from the valve seat 20 and cold water will be admitted to the mixing chamber. If the valve drive block 33 is moved downwardly and also to the left, then both the hot and the cold water valves will be opened, and the proportions of hot and cold water admitted to the mixing chamber will depend on the relative movement of the valve brackets 21 and 22.

The means for closing the upper end of the mixing chamber, as viewed in Figure 3, will next be described. In the top of the valve drive block 33 is a cylindrical cavity 34. Secured within the cavity 34, as by a pressed tight fit, or by soldering or brazing, is the cylindrical portion of a funnel-shaped member 35. The flaring conical lip of the member 35 extends above the top of the valve drive block. Secured firmly within the funnel-shaped member 35 is another funnel-shaped member 36. Tightly clamped between the flaring lips of the members 35 and 36 is the inner edge of a flexible annular diaphragm 37. The outer edge of this annular diaphragm is clamped tightly against the upper edge of the cylindrical liner 13, for example by means of a cup-shaped retainer ring 38 secured in place by a pressed tight fit, or by screws or other suitable means.

The annular diaphragm 37 is impervious to the fluids to be mixed and is able to withstand the fluid pressure, and therefore constitutes a closure for the upper end of the mixing chamber. In the illustrative embodiment a non-metallic diaphragm is shown, but a metal bellows or other flexible corrugated metal diaphragm might be employed with suitable changes in the connections to the valve drive block 33 and the upper edge of the liner 13. Since the diaphragm is flexible, the valve drive block 33 is capable of limited movement to actuate the U-shaped valve brackets 21 and 22, and thereby control the flow of hot and cold water or other fluids into the mixing chamber.

The means for moving the valve drive block 33 to actuate the valve brackets and control the flow of hot and cold water into the mixing chamber will not be described. By this means the hot water valve may be opened or closed to the extent necessary to permit flow of hot water only into the mixing chamber at the desired rate, or the cold water valve may be opened or closed to the extent necessary to permit flow of cold water only into the mixing chamber at the desired rate, or the hot and cold water valves may be opened or closed simultaneously and proportionately to adjust the rate of flow of any desired proportions of hot and cold water into the mixing chamber. To accomplish this result a special lever mechanism is employed. The lever mechanism may be thought of as being in the form of a three tined fork. The center tine engages the valve drive block 33. The two outer tines provide the pivotal connection to a mounting which is rotatably adjustable with respect to the mixing chamber.

The cylindrical portion of the inner funnel-shaped member 36 mounted in the valve drive block 33 forms a socket for the reception of a ball 39, which is secured to one end of a valve actuating lever 40. Secured on this lever near its other, or outer, end is a dome shell 41, and secured on the outer end of the lever beyond the dome shell is a knob 42 for manipulation of the lever about its pivotal axis and for rotatable adjustment of the lever mounting about the mixing chamber. The dome shell 41 is approximately in the shape of a spherical lune, the spherical angle in the illustrative embodiment being in the neighborhood of 150°. The ends or cusps of the dome shell correspond to the outer tines of the fork and provide the pivotal connection for lever 40. Actually the edges of the dome shell extend slightly beyond the defines of a spherical lune, and the cusps of the shell are drilled at the intersections of two great circles to receive and pivot on the inner ends of oppositely disposed pivot pins 43, which determine the pivotal axis of the lever 40.

The pivot pins 43 are mounted in the cylindrical wall of the outer shell 44, on a diameter thereof. The upper edge of the outer shell 44 is turned inwardly as shown at 45 and covers the upper side edge of the dome shell 41 when the lever 40 is at either limit of its pivotal adjustment. The lower edge of the outer shell 44 is flanged as shown at 46, and rests on the base plate 11. As may be seen in Figure 3, the base plate 11 has a circumferential boss 47, the height of which is equal to or very slightly greater than the thickness of the flange 46. Thus there is provided on the upper surface of the base plate, outside the mixing chamber and between the cylindrical flange 12 and the boss 47, an annular bearing channel in which the flange 46 rests. This channel is wider than the flange 46. Means for rotatably adjusting the outer shell 44 relative to the valve drive block 33 will be described hereinafter.

For reasons which will appear as the description proceeds, the pivotal axis P of the lever 40 is displaced slightly to one side of the longitudinal axis of the mixing chamber, and also slightly above the center C of the ball 39, along the axis of the lever 40. This may be seen by inspection of Figures 3 and 4.

Figure 6:
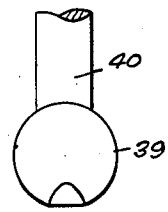
Figure 6 is a detail of the ball on the end of the valve actuating lever.

Since the pivotal axis P of the lever 40 is slightly to one side of the longitudinal axis of the cylindrical mixing chamber, to the left as viewed in Figure 3, turning the lever from its position as shown in Figure 3 to the right will cause the ball 39 to move the valve drive block from its central position in the mixing chamber to the left, thereby opening the cold water inlet. Because the pivotal axis P of the lever 40 also is slightly above the center C of the ball, the bottom of the ball would press against and bind on the bottom of the cylindrical cavity 34 unless precautions were taken to prevent this, for example by adjusting the parts so that the bottom of the ball would just clear the bottom of the cavity when the lever was in its vertical position. This would mean that there would be considerable play between the ball and the bottom of the cavity for all other tilted positions of the lever. Desirably a portion is removed from the bottom of the ball 39 on a radius of the pivotal axis P of the lever, as shown in Figure 6, so that the ball will remain substantially in contact with the bottom of the cavity 34 for all tilted positions of the lever. Also it will be desirable to include a compression coil spring 32 in the cup-like extension 28 depending from the base plate 11, surrounding the pin 27, to press the U-shaped valve brackets resiliently upwardly against the valve drive block 33. This will eliminate play between the brackets and the valve drive block, and between the ball and the bottom of the cavity 34, and will insure desirable friction between all moving parts of the valve mechanism to hold the valve in any adjusted position.

As may be seen in Figures 3 and 4, the cylindrical wall of the outer shell 44 has mounted therein, a short distance above the flange 46, two follower buttons 48 and 49 which project outwardly from the wall of the shell. These buttons are of slightly different lengths and engage the inner edge of the annular ring 50, thus locating the outer shell 44 eccentrically with respect to the annular ring and also with respect to the longitudinal axis of the mixing chamber. These buttons 48 and 49 are located on a diameter of the shell 44 which is at right angles to the axis of the pivot pins 43. It will be evident that when the shell 44 is rotatably adjusted relative to the mixing chamber, the pivotal axis of the valve actuating lever 40, displaced to one side of the longitudinal axis of the mixing chamber, will move around the longitudinal axis of the mixing chamber. By rotatably adjusting the shell 44 relative to the mixing chamber it is possible to vary infinitely the relative movement of the valve brackets 21 and 22 caused by tilting the valve actuating lever 40 about its pivotal axis. As a result, tilting the valve actuating lever 40 will control the admission of hot water only to the mixing chamber, or of cold water only, or of hot and cold water in any proportions depending on the rotatable adjustment of the outer shell 44, and for all of these conditions the volume of water admitted to the mixing chamber will be controlled by the extent to which the valve actuating lever 40 is tilted from the closed position.

Rotatable adjustment of the outer shell 44 relative to the mixing chamber is limited to 90°, or less. Conveniently this may be accomplished, as shown in Figure 4, by providing on the outer wall of the mixing chamber a cam 50 having a stop 51 which extends approximately one-quarter of the way around the mixing chamber and is engaged by the inwardly projecting end of one of the pivot pins 43 at each limit of angular adjustment. One end of this stop 51 will be engaged by one of the pivot pins 43 at one limit of the rotatable adjustment of the shell 44, and the other end of this stop will be engaged by the other pivot pin 43 at the other limit of the rotatable adjustment.

The inner ends of the pivot pins 43 slidably engage the outer surface of the cam 50 at diametrically opposite locations. Desirably the inner ends of the pivot pins 43 are tapered, as may be seen in Figure 4, and the ends of the stop 51 are inclined at a corresponding angle. The ends of the cam 59 diametrically opposite the ends of the stop 51 also are tapered, as shown in Figure 4. When the shell 44 is turned firmly to either limit of its angular adjustment, as determined by engagement of one of the pivot pins 43 with one end of the stop 51, the tapered end of the pin 43 tends to ride up the inclined end of the stop 51. Since the diametrically opposite end of the cam 59 is thinner, the shell 44 and its connected parts actually will be moved slightly in a transverse direction as the shell is turned to the limit of angular adjustment. This will compensate for any wear of the valve disks and insure a firm seating of one of the valve disks 23, 24 on its valve seat—which one depending on which way the shell is turned—and thus positively close one or the other of the inlet valves.

For residential use the stop 51 usually will extend one-quarter the way around the mixing chamber, thus permitting control of the water temperature from full hot all the way to full cold. However, in hotels and certain other buildings the temperature of the hot water may be so high as to present danger of scalding an unwary user, and it may be desirable to prevent use of the hot water at the temperature of the supply line. The present valve is peculiarly suited to accomplish this object. Merely by extending the stop 51 further around the mixing chamber it is possible to limit the angular adjustability of the shell 44 and insure that some cold water always will be mixed with the hot water. This is an important safety feature.

With the valve actuating lever in the position shown in Figure 3, the valve drive block 33 is centered in the mixing chamber, the center of the ball 39 lies on the longitudinal axis of the mixing chamber, and both the hot and cold water inlets to the mixing chamber are closed. Also, the outer shell 44 is as far as it can turn to the right, further rotation being prevented by engagement of one of the pivot pins 43 with one end of the stop 51. From this position, the outer shell 44 may be turned to the left through an angle of 90°, or until the other pivot pin 43 engages the other end of the stop 51. Since, in the condition described, the center of the ball 39 lies on the longitudinal axis of the mixing chamber, both the hot and cold water inlets to the mixing chamber will remain closed during rotatable adjustment of the outer shell through the entire 90° angle, provided the valve actuating lever 40 is not turned about its pivotal axis. Thus it is possible to preselect the water temperature before the valves are opened to permit flow of any water.

Tilting the valve actuating lever to the right, from the position as shown in Figure 3, would move the valve bracket 22, but not the valve bracket 21, and therefore would open the cold water inlet to the mixing chamber, but would not open the hot water inlet. With the outer shell 44 rotated 90° to the left from the position shown in Figure 3, tilting the valve actuating lever would move the valve bracket 21, but not the valve bracket 22, and therefore would open the hot water inlet to the mixing chamber, but would not open the cold water inlet. For any rotatable adjustment of the outer shell 44 between the two limiting positions, tilting the valve actuating lever would move both valve brackets and would admit both hot and cold water to the mixing chamber, the proportions of hot and cold water admitted to the mixing chamber depending on the angular position of the outer shell with respect to the mixing chamber, and remaining substantially constant for all tilted positions of the lever. With the angular adjustment shown in Figure 4, where the outer shell is in the middle of its range, tilting the valve actuating lever would cause the valve brackets 21 and 22 to move equally, thus admitting equal amounts of hot and cold water to the mixing chamber.

Figure 7:
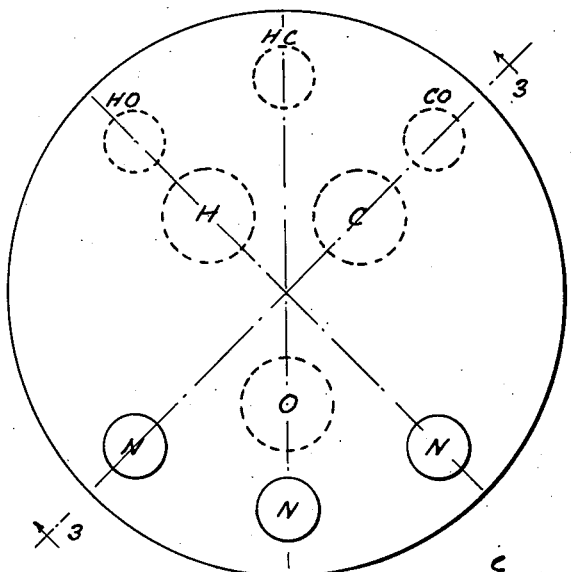
Figure 7 is a schematic diagram showing the portions of the valve actuating lever for flow of hot water only, and cold water only, and a mixture of hot and cold water.

Figure 7 is a schematic diagram showing the water flow for various settings of the valve actuating lever. In this diagram H represents the hot water inlet, C represents the cold water inlet, and O represents the outlet for the mixed water. When the knob 42 on the valve actuating lever is tilted all the way down in any one of the positions designated N, or in any intermediate positions, the water flow will be entirely cut off. When the knob is tilted all the way up to the position designated HO, there will be a maximum flow of hot water; to the position designated CO, a maximum flow of cold water; and to any position HC intermediate the positions HO and CO, a maximum flow of mixed water, the proportions of hot and cold water depending on the angular adjustment. For any angular adjustment, merely tilting the valve actuating lever will vary the flow without changing the proportions of hot and cold water. Changing the angular adjustment without tilting the lever will vary the proportions of hot and cold water while the flow remains unchanged. It will be evident that the tilted position of the lever and the angular adjustment both may be varied, independently or simultaneously, merely by manipulation of the knob 42 on the outer end of the valve actuating lever, the knob being held by the fingers of one hand.

Figure 5:
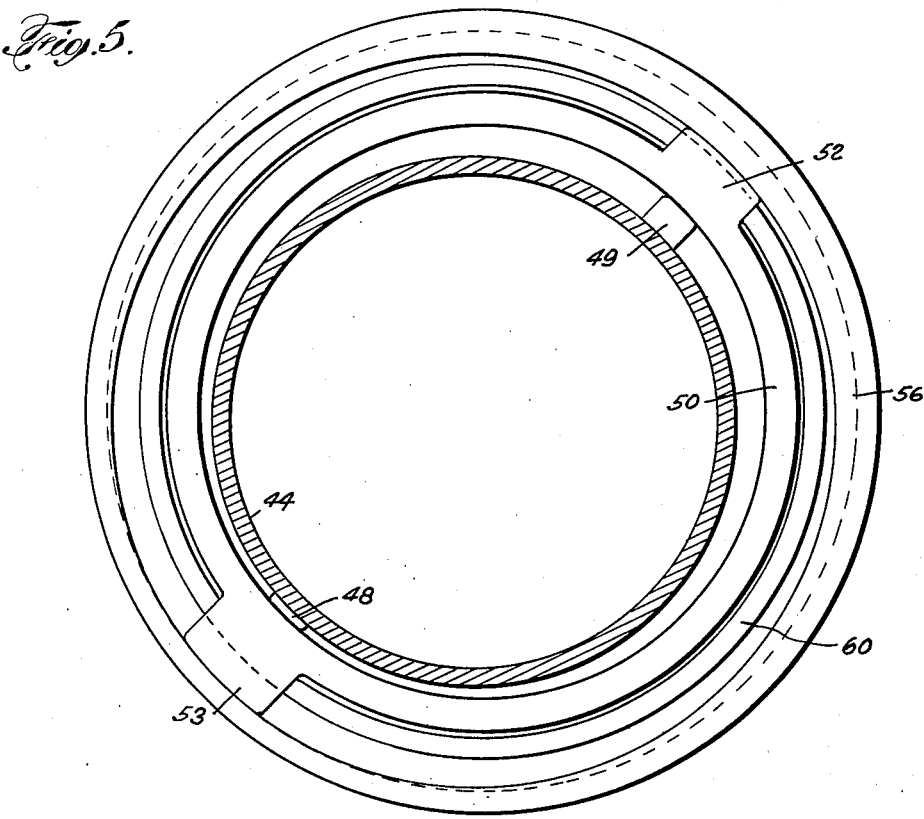
Figure 5 is a horizontal section substantially on the line 5—5 of Figure 3, but with the mixing chamber and valve structure omitted for simplicity.

Desirably, means are provided whereby the eccentricity of the outer shell 44 relative to the mixing chamber may be varied to provide for accurate initial adjustment of the valve and also to permit takeup for wear on the valve disks. Referring particularly to Figure 5, and also to Figures 3 and 4, it will be seen that the annular ring 50 is provided with two diametrically opposed lugs 52, 53. As may be seen in Figure 3, the annular ring 50 is supported on the inwardly flanged upper edge 54 of the screw ring 55. The annular ring 50 is held against rotation on the flange 54 by diametrically opposed slots in a circumferential ridge 60 on the top surface of the flange, which slots receive the lugs 52, 53, but the annular ring may slide on the flange in the direction of its diameter through the lugs. The slots are positioned on the flange 54 so that the annular ring can slide along a line which bisects the angle between the hot and cold water inlets to the mixing chamber. By adjusting the annular ring 50 along this line, the amount of eccentricity of its inner edge, engaged by the follower buttons 48, 49, relative to the mixing chamber may be varied.

The position of the annular ring 50 on the flange 54 may be regulated by means of the adjusting ring 56, journaled on the upper end of the screw ring 55. The outer edge of the adjusting ring conveniently may be knurled as shown to provide a good grip for the hand. The inner edge of the adjusting ring 56, which engages the lugs 52, 53, is eccentric, so that rotation of this ring will cause the annular ring 50 to slide on the flange 54 in the direction of the diameter through the lugs.

Conveniently, an annular cover plate 57 overlies the adjusting ring 56 and the outer edge of the annular ring 50. The inner edge of this cover plate may be suitably formed to engage matching slots in the ridge 60, as shown in Figure 4, to center the cover plate in the assembly and hold it against rotation. The space between the inner edge of the cover plate 57 and the outer shell 44 may be covered by an annular flaring flange 58, rigidly secured on the cylindrical wall of the outer shell 44, and slidable over the cover plate as the outer shell is rotatably adjusted.

The particular mixing valve described herein for purposes of illustration embodies a cylindrical mixing chamber within which the valve actuating mechanism is centered. It has already been pointed out that the mixing chamber need not be cylindrical, although such a construction may have advantages in many cases. Neither is it necessary that the valve actuating mechanism be centered in the mixing chamber, and references herein to the longitudinal axis of the mixing chamber, used merely for convenient reference in describing the axis through the valve actuating mechanism, will be understood to mean the axis normal to the lines of movement of the two valve brackets at their point of intersection. This is the longitudinal axis through the guide pin 27, and in the illustrative embodiment this coincides with the longitudinal axis of the mixing chamber, although that is not essential to the invention.

I claim:

1. A mixing valve comprising, in combination, means providing a mixing chamber, an outlet opening from the mixing chamber, two inlet openings to the mixing chamber spaced 90° apart, valve means for each inlet opening, separate valve brackets supporting the valve means, the valve brackets crossing each other and being independently movable rectilinearly toward and away from their associated inlet openings, valve operating means mounted for rectilinear movement along any line which lies within the 90° angle included between the inlet openings and passes through the apex thereof, operative connections between the valve operating means and the valve brackets for moving the valve brackets rectilinearly toward and away from their inlet openings upon movement of the valve operating means toward and away from the respective inlet opening, and valve actuating means for moving the valve operating means selectively along any line which lies within the 90° angle included between the inlet openings to move the valve brackets independently or simultaneously depending on the angle of the line of movement of the valve operating means.

2. A mixing valve according to claim 1, in which the valve actuating means comprises a lever for moving the valve operating means, and mounting means for said lever rotatably adjustable through an angle of 90° about the axis normal to the lines of movement of the two valve means at their point of intersection.

3. A mixing valve according to claim 2, in which the pivotal axis for the valve actuating lever is displaced slightly to one side of the aforesaid axis, outside the 90° angle included between the inlet openings.

4. A mixing valve according to claim 1, in which the valve actuating means comprises a lever for moving the valve operating means, and mounting means for said lever eccentrically disposed with respect to the axis normal to the lines of movement of the two valve means at their point of intersection, and rotatably adjustable through an angle of 90° about the aforesaid axis.

5. A mixing valve according to claim 4, including means for adjusting the said lever mounting means transversely of the mixing chamber for varying the eccentricity of the lever mounting means with respect to the aforesaid axis.

6. A mixing valve according to claim 1, in which the valve actuating means comprises a lever for moving the valve operating means, mounting means for said lever rotatably adjustable through an angle of 90° about the axis normal to the lines of movement of the two valve means at their point of intersection, and also adjustable within a narrow range transversely relative to the mixing chamber, and cam means for moving the lever mounting means transversely when it is adjusted to either limit of its angular adjustment.

7. A valve for a hot and cold water mixing faucet comprising, in combination, a mixing chamber, a closure for one end thereof having an outlet opening, hot and cold water inlet openings in the side wall of the mixing chamber arranged at 90° from each other, a valve seat for each of the inlet openings, two U-shaped valve brackets within the mixing chamber, each bracket having a bottom portion and two legs, each bracket being movable along a straight line toward and away from one of the valve seats and carrying on one leg thereof a valve disk for engagement with one of the valve seats, the bottoms of the U-shaped valve brackets crossing each other at right angles and being slidable relative to each other, a square block located between the legs of the crossing valve brackets and slidably engaged by the legs of both brackets, a flexible annular diaphragm sealed at its inner edge to the block and forming a closure for the other end of the mixing chamber, a socket in the block, a ball in the socket, a lever connected at one end to the ball for moving the ball and the block to move the valve brackets, rotatably adjustable mounting means for the lever, the pivotal axis of the lever being slightly above the center of the ball along the axis of the lever and displaced slightly to one side of the axis normal to and passing through the intersection of the lines of movement of the valve brackets, said mounting means being rotatably adjustable through an angle of 90° about the last mentioned axis.

8. A valve for a hot and cold water mixing faucet comprising, in combination, a mixing chamber, a closure for one end thereof, an outlet opening from the mixing chamber, hot and cold water inlet openings in the side wall of the mixing chamber arranged at 90° from each other, a valve seat for each of the inlet openings, two U-shaped valve brackets within the mixing chamber, each bracket having a bottom portion and two legs, the bottoms of the U-shaped valve brackets crossing each other at right angles, and each bracket being slidable relative to the other along a straight line toward and away from one of the valve seats, and each bracket carrying on one leg thereof a valve disk for engagement with one of the valve seats, a rectangular block located between the legs of the crossing valve brackets and slidably engaged by the legs of both brackets, a flexible annular diaphragm sealed at its inner edge to the block and forming a closure for the other end of the mixing chamber, a socket in the block, a ball in the socket, a lever connected at one end to the ball for moving the ball and the block to move the valve brackets, rotatably adjustable mounting means for the lever, the pivotal axis of the lever being slightly above the center of the ball along the axis of the lever and displaced slightly to one side of the axis normal to and passing through the intersection of the lines of movement of the valve brackets, said mounting means being rotatably adjustable through an angle of 90° about the last mentioned axis.

9. A valve for a hot and cold water mixing faucet according to claim 8, in which the mounting means for the lever is adjustable within a narrow range transversely of the mixing chamber, and including cam means for moving the lever mounting means transversely when it is adjusted to either limit of its angular adjustment.

10. A valve for a hot and cold water mixing faucet according to claim 8, in which the mounting means for the lever includes a dome shell secured on the lever near its outer end.

11. A valve for a hot and cold water mixing faucet according to claim 10, in which the dome shell is pivotally mounted in an outer, rotatably adjustable shell.

12. A valve for a hot and cold water mixing faucet according to claim 11, in which the outer shell is rotatable through an angle of 90° about the said axis.

13. A mixing valve comprising, in combination, a mixing chamber, an outlet opening from the mixing chamber, two inlet openings in the wall of the mixing chamber arranged at 90° from each other, a valve seat for each of the inlet openings, two U-shaped valve brackets within the mixing chamber, each bracket having a bottom portion and two legs, the bottoms of the U-shaped valve brackets crossing each other at right angles, each bracket being slidable relative to the other along a straight line toward and away from one of the valve seats and carrying on one leg thereof a valve disk for engagement with one of the valve seats, a rectangular block located between the legs of the crossing valve brackets and slidably engaged by the legs of both brackets, a flexible annular diaphragm sealed at its inner edge to the block and forming a closure for the mixing chamber, a socket in the block, a ball in the socket, a lever connected at one end of the ball for moving the ball and the block to move the valve brackets, rotatably adjustable mounting means for the lever, the pivotal axis of the lever being slightly above the center of the ball and displaced slightly to one side of the axis normal to and passing through the intersection of the lines of movement of the valve brackets, said mounting means being rotatably adjustable through an angle of 90° about the last mentioned axis.

14. A mixing valve according to claim 13, in which the angle of rotatable adjustment of the mounting means for the lever is less than 90°.

15. A mixing valve according to claim 13, in which the mounting means for the lever is adjustable within a narrow range transversely of the mixing chamber, and including cam means for moving the lever mounting means transversely when it is adjusted to either limit of its angular adjustment.

16. A mixing valve according to claim 13, in which the mounting means for the lever is adjustable within a narrow range transversely of the mixing chamber, and including cam means for adjusting the amount of displacement of the pivotal axis of the lever to one side of the said other axis.

17. A mixing valve according to claim 1, including mounting means for said valve actuating means rotatably adjustable through an angle of 90° about the axis normal to the lines of movement of the two valve means at their point of intersection.

References Cited in the file of this patent

UNITED STATES PATENTS

| Number | Name | Date |
|---|---|---|
| 1,187,245 | Bjerke | June 13, 1916 |
| 1,478,688 | Whidden | Dec. 25, 1923 |
| 1,742,307 | Eble | Jan. 7, 1930 |
| 2,205,684 | Cochran | June 25, 1940 |